March 17, 1925.                         1,529,680
E. W. ACKERMAN ET AL
SHOCK ABSORBER
Filed July 30, 1923          2 Sheets-Sheet 1
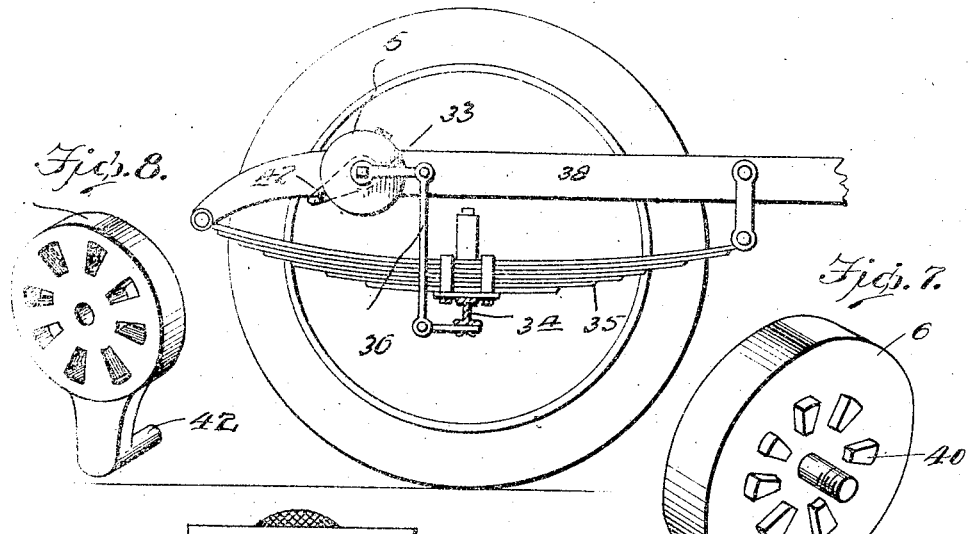
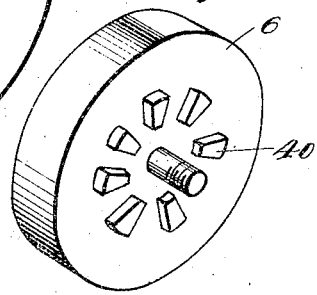
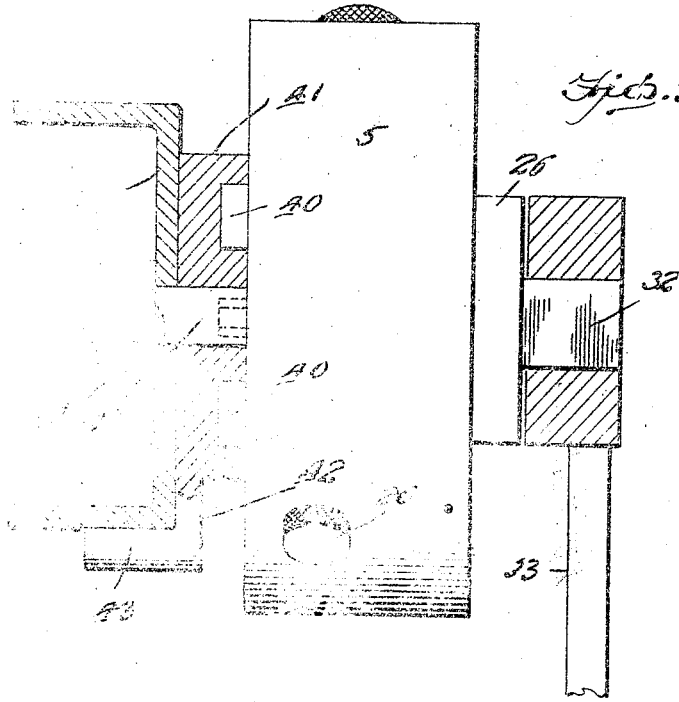
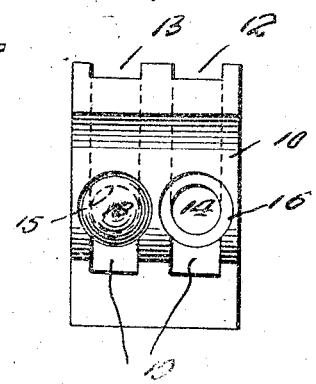
E. W. Ackerman
G. C. Nicholson
Inventors March 17, 1925.
E. W. ACKERMAN ET AL
1,529,680
SHOCK ABSORBER
Filed July 30, 1923      2 Sheets-Sheet 2
Fig. 2.
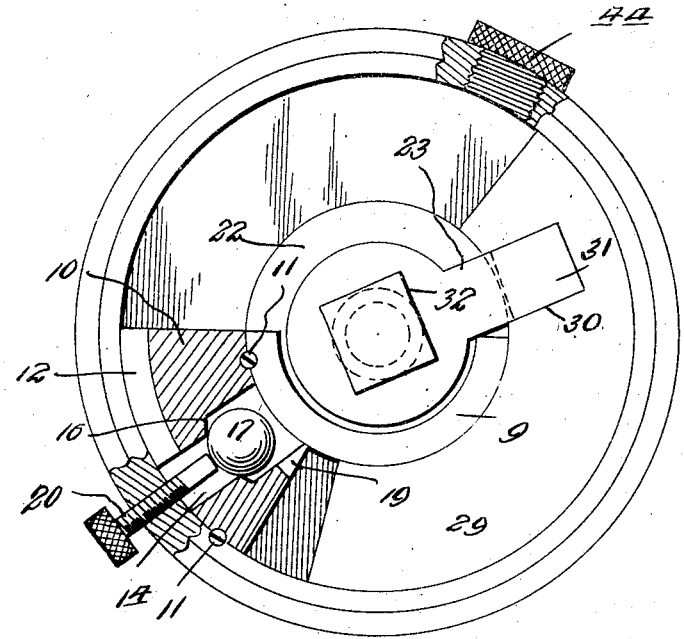
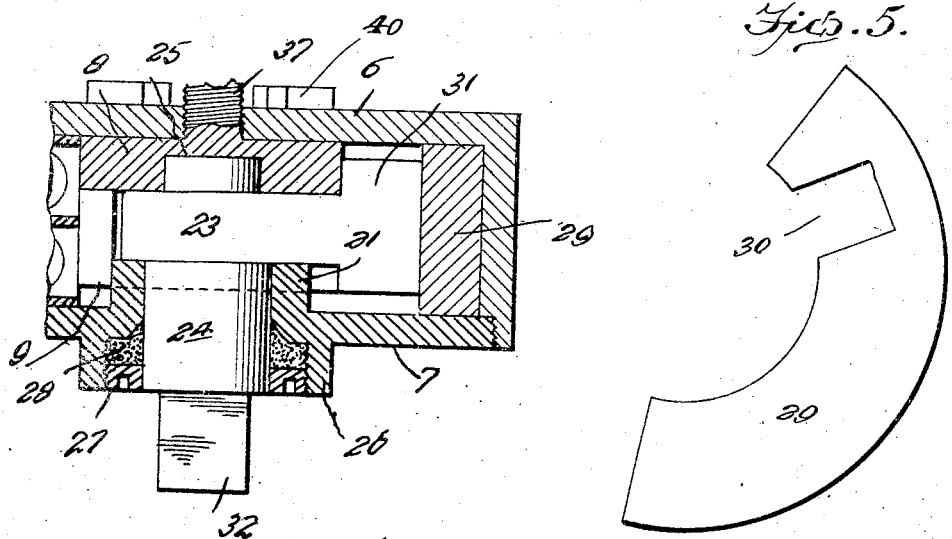
Fig. 4.    Fig. 5.
Witnesses:
E. W. Ackerman
G. C. Nicholson
Inventors
By
Attorney Patented Mar. 17, 1925.

1,529,680

UNITED STATES PATENT OFFICE,

ERNEST W. ACKERMAN AND GRIFFITH C. NICHOLSON, OF MONROE, MICHIGAN.

SHOCK ABSORBER.

Application filed July 30, 1923. Serial No. 654,545.

*To all whom it may concern:*

Be it known that we, ERNEST W. ACKERMAN and GRIFFITH C. NICHOLSON, citizens of the United States, residing at Monroe, in the county of Monroe and State of Michigan, have invented certain new and useful Improvements in Shock Absorbers, of which the following is a specification.

This invention relates to certain new and useful improvements in shock absorbers for motor vehicles, and has particular reference to devices of this kind by means of which the shock resulting from rebound is absorbed so that objectionable jolting of the occupants of a vehicle is greatly minimized.

The primary object of the invention is to generally simplify and improve devices of the above kind whereby they may meet with all of the requirements for a successful commercial use.

Another object of the invention is to provide a shock absorber which embraces the desired qualities of simplicity and durability of construction as well as efficiency in operation.

Another object of the invention is to provide a shock absorber of the hydraulic oscillating piston type, wherein a minimum number of parts are employed, and wherein said parts are of a durable and simple form and capable of being easily and quickly replaced when worn or damaged.

A further object of the invention is to provide means for connecting the casing of a shock absorber to the side rails of the chassis of a motor vehicle, which means may be readily accommodated to chassis rails of different sizes in a convenient and expeditious manner.

Other objects will appear as the nature of the invention is better understood, and the same consists in the novel form, combination and arrangement of parts hereinafter more fully described, shown in the accompanying drawings and claimed.

In the drawings, wherein like characters indicate corresponding parts throughout the several views:

Figure 1 is a side elevational view, showing the shock absorber constructed in accordance with the present invention and applied to the front spring of a motor vehicle chassis.

Figure 2 is an enlarged side view of the shock absorber with the removable side plate removed and parts in section.

Figure 3 is a view partly in section and partly in front elevation of the device shown in Figure 1 and drawn on a larger scale.

Figure 4 is a fragmentary transverse sectional view, taken through the shock absorber casing to reveal details of the invention.

Figure 5 is a side elevational view of the piston, and

Figure 6 is an inner face view of the valved abutment.

Figures 7 and 8 illustrate detailed perspective views respectively of the lugs on the casing, and the recesses in the plate or setting member for receiving said lugs.

Referring more in detail to the drawings, the invention embodies a circular casing 5 having an inner side wall 6 which is preferably formed integral with the rim of the casing, the outer side of the latter being closed by means of the removable cover plate 7 which is preferably threaded into the outer end of the casing as shown in Figure 4. Arranged within the casing 5 is a bearing plate 8, which is in contact with the inner surface of the wall 6 and has an outer circular casing 5 so as to provide a chamber therebetween. Arranged within this chamber is an arcuate block or abutment 10, and as shown in Figure 2, this abutment may be held stationary by pinning the same to the adjacent walls of the flange 9 and casing by means of screws 11 or the like.

The abutment 10 is formed with a pair of longitudinal grooves 12 and 13 which extend from one end of the abutment to respective ones of a pair of radial ports 14 and 15, respectively, which are provided in the abutment. The walls of these ports are formed to provide annular seats 16 for outwardly seating check valves 17 and 18 which are preferably in the nature of small spheres loosely arranged in the enlarged inner portions of said ports 14 and 15. As shown in Figures 2 and 6, the ports 14 and 15 are in communication at the opposite end of the abutment 10 by means of grooves 19 provided in the inner face of the abutment, and an adjusting screw 20 is threaded radially through the outer wall of the casing and enters the port of one of the valves 17 and 18 so that the inner end of said screw engages said valve for limiting the latter in its movement toward its seat. The screw 20 thereby provides means for adjustably regulating the degree of closing movement of the valve with which it is associated so that a certain amount of fluid may pass through the abutment from one side of the latter to the other, for a purpose and in a manner which will presently become apparent.

The flange 9 of the bearing sleeve 8 telescopes onto an annular internal flange 21 provided on the removable cover plate 7, and said flange 9 is provided with an arcuate slot 22 in which is movable a radially and outwardly extending arm 23 that is suitably fixed upon a central transverse rock shaft 24. The rock shaft 24 preferably embodies an enlarged cylindrical end portion journalled in the flange 21, and a circular socket 25 is provided in the inner face of the bearing plate 8 in which the inner end of the shaft 24 is journalled. The cover plate 7 is also provided with an external annular flange 26 that is of slightly greater diameter than the flange 21 and internally threaded to receive a threaded packing ring 27, while a suitable packing 28 is disposed within the flange 26 about the shaft 24 and inwardly of the packing ring 27 to prevent leakage of the fluid out of this end of the casing from the chamber between the outer wall of the casing and the flange 9.

An arcuate piston 29 is arranged within the chamber provided between the casing and the flange 9 and is movable therein for a limited distance, one end of this piston being provided with a transverse groove or notch 30 in its inner face to receive the enlarged head 31 provided on the outer end of the arm 23. The shaft 24 projects through the flange 26 where it is preferably squared as at 32 for reception of one end of an arm 33 which is adapted to be connected to the axle 34 of the vehicle or some other part to which the spring 35 is connected, by means of a connection including a depending link 36 which is pivoted to the outer end of the arm 33.

As shown in Figures 3 and 4, the bearing plate 8 is provided with a central rigid bolt 37 that projects through a central opening in the wall 6, and this bolt 37 is adapted to extend through an opening in the web of the chassis side bar 38 and to receive a nut 39 whereby the casing 5 and parts carried thereby are rigidly attached in place. In order that the casing 5 may be held against rotation in the direction in which resistance is offered to the movement of the piston 29, the wall 6 is provided with an annular series of radial elongated lugs 40, which are seated within similar sockets in a bracket plate 41 which is loosely disposed upon the bolt 37 and this bracket plate 41 is formed with a radially extending arm 42 whose outer end terminates in an outwardly extending lug 43, adapted to engage the underside of the chassis bar or rail 38, when disposed on an incline shown in Figure 1. Obviously by disengaging the lugs 40 from the sockets of the plate 41, the angular position of the arm 42 may be changed so as to accommodate the device to the chassis rails of different sizes.

The casing may be filled with a suitable fluid, such as oil, through an opening provided therein and which is closed by means of a removable plug 44.

In operation, the screw 20 is adjusted so as to limit the movement of the valve 17 the desired distance from its seat 16, whereby when the piston 29 rotates clockwise, a certain amount of the oil will be allowed to pass through the abutment 10. When a depression or other irregularity is encountered in the road, the spring 35 will be pressed upwardly toward the chassis, thereby causing the arm 33 to move upwardly, and moving the piston 29 in an anti-clockwise direction toward the abutment 10. The fluid is then forced through the grooves 12 and 13 and the ports 14 and 15 at which time the check valves are readily unseated so as to form little or no opposition to the passage of the fluid through the abutment to the opposite side of the latter. Upon the return of the spring and chassis to normal position, the arm 22 is moved downwardly so as to cause movement of the piston 29 in a clockwise direction, thereby compressing the fluid between the piston and the adjacent end of the abutment 10. This compression takes place as the valve 18 is seated and the valve 17 is nearly seated for allowing only a small amount of the fluid to pass through the abutment in this direction. In this way, the shock resulting from the rebound is effectively absorbed.

From the foregoing description, it is believed that the construction and operation as well as the advantages of the present invention will be readily understood and appreciated by those skilled in the art.

Minor changes may be made without departing from the spirit and scope of the invention as claimed.

What we claim as new is:

1. In combination with a shock absorber casing having an inwardly extending attaching screw or bolt adapted to pass through the web of the side rail of a vehicle chassis, a circular series of rigid radially disposed lugs upon the inner wall of said casing, a bracket plate loosely disposed upon the bolt and having a circular series of sockets adapted for reception of said lugs in any rotary adjusted position of the bracket plate relative to the casing, a rigid radial arm provided on said bracket plate, and an outturned lug on the outer end of said arm adapted to engage the under side of the side rail of the chassis when said arm is disposed at an incline.

2. In a hydraulic shock absorber of the class described, a cylindrical casing having side walls, one of which is removable and is formed with an annular inwardly extending flange, a bearing plate disposed within the casing against the inner wall thereof and provided with a central socket, a shaft journalled in said flange and said socket, a rigid circular flange upon the bearing plate telescoped onto the flange of the removable wall of the casing and provided with an arcuate slot, means for connecting said shaft to the spring of a vehicle for causing rotation of the shaft when said spring is flexed, an outwardly extending radial arm fixed upon said shaft and working in said slot, an arcuate piston arranged within the casing between the flange of the bearing plate and the casing and having a notch at one end into which the outer end of said arm projects, a fixed abutment arranged within the casing between the bearing plate flange and the casing and provided with ports thru which fluid in the casing may flow from one side of the abutment to the other, check valves for permitting free flow of the fluid in one direction and preventing the flow of the same in the opposite direction, and means associated with one of said valves and the casing for adjustably limiting the movement of one of the valves toward its seat whereby restricted flow of the fluid is allowed in said other direction.

3. In a hydraulic shock absorber of the class described, a cylindrical casing having side walls, one of which is removable and is formed with an annular inwardly extending flange, a bearing plate disposed within the casing against the inner wall thereof and provided with a central socket, a rigid circular flange upon the bearing plate telescoped onto the flange of the removable wall of the casing and provided with an arcuate slot, means for connecting said shaft to the spring of a vehicle for causing rotation of the shaft when said spring is flexed, an outwardly extending radial arm fixed upon said shaft and working in said slot, an arcuate piston arranged within the casing between the flange of the bearing plate and the casing and having a notch at one end into which the outer end of said arm projects, a fixed abutment arranged within the casing between the bearing plate flange and the casing and provided with ports thru which fluid in the casing may flow from one side of the abutment to the other, check valves for permitting free flow of the fluid in one direction and preventing the flow of the same in the opposite direction, and means associated with one of said valves and the casing for adjustably limiting the movement of one of the valves toward its seat whereby restricted flow of the fluid is allowed in said other direction, said bearing plate having an integral bolt projecting inwardly through the inner wall of the casing and adapted to pass through the side rail of a chassis for securing the shock absorber to the latter.

4. A hydraulic shock absorber including a circular casing, a bearing plate within the casing having an annular flange in spaced relation to the outer wall of the casing to provide an annular chamber, a shaft journalled axially in one wall of the casing and the bearing plate, said flange of the bearing plate being formed with an arcuate slot, a radial arm fixed upon the shaft, an arcuate piston within said chamber attached to the outer end of said arm, a fixed abutment arranged within the chamber and having passages therethrough through which fluid in the chamber may pass in either direction, and means including a pair of check valves and an adjusting screw associated with one of said valves for allowing free passage of the fluid in one direction through the abutment and restricted passage thereof in an opposite direction.

5. In combination, a shock absorber casing, and means for attaching said casing to the frame bar of a vehicle chassis, said means including a member for attaching said casing to said frame bar to permit a relative rotative movement of the casing on the frame bar for adjusting the same relative thereto, and setting means co-operating with the casing and the frame bar for setting said casing in any one of the plurality of positions relative to said frame bar.

6. In combination, a shock absorber casing, and means for attaching said casing to the frame bar of a vehicle chassis, said means including a member for attaching said casing and holding it in position on the frame bar, and a setting member having means co-operating with means on the shock absorber casing adapted for disengageable association for permitting relative adjustment of a shock absorber casing to any one of a plurality of positions with respect to said setting member, and said setting member being formed for co-operation with the frame bar of a vehicle chassis, whereby said shock absorber casing may be set in any one of a plurality of positions relative to said frame bar.

In testimony whereof we affix our signatures.

ERNEST W. ACKERMAN.
GRIFFITH C. NICHOLSON.